US009981836B2

(12) United States Patent
Castaneda et al.

(10) Patent No.: US 9,981,836 B2
(45) Date of Patent: May 29, 2018

(54) METHOD FOR CONTROLLING A FUNCTIONAL SYSTEM OF A MATERIALS HANDLING VEHICLE

(71) Applicant: Crown Equipment Corporation, New Bremen, OH (US)

(72) Inventors: Anthony T. Castaneda, Troy, OH (US); James E. Clapp, Dublin, OH (US); Nicholas D. Thobe, Chickasaw, OH (US); Eric L. Schnipke, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 85 days.

(21) Appl. No.: 15/009,174

(22) Filed: Jan. 28, 2016

(65) Prior Publication Data

US 2016/0289056 A1    Oct. 6, 2016

Related U.S. Application Data

(60) Provisional application No. 62/140,819, filed on Mar. 31, 2015, provisional application No. 62/246,225, filed on Oct. 26, 2015.

(51) Int. Cl.
*B66F 9/24* (2006.01)
*B60R 16/033* (2006.01)
(Continued)

(52) U.S. Cl.
CPC ............ *B66F 9/24* (2013.01); *B60R 16/033* (2013.01); *B66F 9/07572* (2013.01); *B66F 9/20* (2013.01)

(58) Field of Classification Search
USPC ......................................................... 701/50
See application file for complete search history.

(56) References Cited

U.S. PATENT DOCUMENTS 3,834,494 A   9/1974 Bates et al.
4,655,039 A   4/1987 McCabe et al.
(Continued)

FOREIGN PATENT DOCUMENTS

CN   201890161 U   7/2011
CN   201909971 U   7/2011
(Continued)

OTHER PUBLICATIONS

Sheppard, Bruce; International Search Report and Written Opinion of the International Search Authority; International Application No. PCT/US2016/015382; dated Oct. 14, 2016; European Patent Office; Rijswijk, Netherlands.
(Continued)

*Primary Examiner* — Jonathan L Sample
(74) *Attorney, Agent, or Firm* — Stevens & Showalter LLP

(57) ABSTRACT

Controlling a functional system of a materials handling vehicle includes monitoring a current delivered by an energy storage system for powering the functional system, wherein the energy storage system may include at least one of a battery and a fuel cell. When the current delivered by the energy storage system exceeds a first predetermined amount, performance of the functional system is reduced from a first operating level to a second operating level for at least one task of the functional system to attempt to reduce the current delivered by the energy storage system.

19 Claims, 7 Drawing Sheets

(51) Int. Cl.
  *B66F 9/075* (2006.01)
  *B66F 9/20* (2006.01)

(56) References Cited

U.S. PATENT DOCUMENTS

| | | | |
|---|---|---|---|
| 5,039,924 A | 8/1991 | Avitan | |
| 5,050,379 A * | 9/1991 | Nagai | B66F 9/20 60/368 |
| 5,053,960 A * | 10/1991 | Brekkestran | F16D 48/068 477/76 |
| 5,057,728 A | 10/1991 | Dammeyer et al. | |
| 5,070,283 A | 12/1991 | Avitan | |
| 5,319,963 A * | 6/1994 | Benford | F16H 59/72 374/141 |
| 5,994,650 A | 11/1999 | Eriksson et al. | |
| 6,275,368 B1 | 8/2001 | Yamada et al. | |
| 6,330,933 B1 | 12/2001 | Boeckman et al. | |
| 6,369,460 B1 | 4/2002 | Endoh et al. | |
| 6,456,946 B1 | 9/2002 | O'Gorman | |
| 6,580,990 B2 | 6/2003 | Wager et al. | |
| 7,120,500 B1 | 10/2006 | Seligman | |
| 7,199,534 B2 | 4/2007 | Ford et al. | |
| 7,207,405 B2 | 4/2007 | Reid et al. | |
| 7,235,948 B2 | 6/2007 | Nakakita et al. | |
| 7,627,378 B2 | 12/2009 | Seligman | |
| 7,932,697 B2 | 4/2011 | Funabashi et al. | |
| 8,332,089 B2 | 12/2012 | Nakazawa | |
| 8,433,469 B2 | 4/2013 | Harvey et al. | |
| 8,459,387 B2 | 6/2013 | Field | |
| 8,514,537 B2 | 8/2013 | Higuchi et al. | |
| 8,594,869 B2 | 11/2013 | Hwang | |
| 8,604,803 B2 | 12/2013 | Dooley | |
| 8,613,344 B2 | 12/2013 | Veronesi | |
| 8,639,404 B2 | 1/2014 | Sugiyama et al. | |
| 2004/0015288 A1 | 1/2004 | Wolber et al. | |
| 2004/0189254 A1 * | 9/2004 | Kapsokavathis | H02J 7/1469 320/132 |
| 2005/0039465 A1 * | 2/2005 | Welch | F25B 21/04 62/3.7 |
| 2005/0197794 A1 * | 9/2005 | Full | G01N 21/274 702/100 |
| 2006/0064255 A1 * | 3/2006 | Johnson | G01N 21/3504 702/25 |
| 2006/0097577 A1 * | 5/2006 | Kato | F02N 11/0866 307/10.1 |
| 2007/0069734 A1 * | 3/2007 | Bertness | G01R 31/007 324/411 |
| 2007/0139017 A1 * | 6/2007 | Marchand | G01K 7/42 320/150 |
| 2008/0042615 A1 * | 2/2008 | Serrels | B60L 1/003 320/101 |
| 2008/0196962 A1 * | 8/2008 | Capito | B60K 23/0808 180/249 |
| 2008/0308542 A1 * | 12/2008 | Day | B60L 1/02 219/203 |
| 2009/0237034 A1 | 9/2009 | Lindemann et al. | |
| 2009/0265059 A1 * | 10/2009 | Medwin | B66F 9/0755 701/31.4 |
| 2010/0253145 A1 * | 10/2010 | King | B60L 3/0069 307/46 |
| 2012/0209478 A1 | 8/2012 | Dammeyer et al. | |
| 2012/0235472 A1 | 9/2012 | Aragai et al. | |
| 2012/0293017 A1 | 11/2012 | Lidsky et al. | |
| 2012/0326509 A1 | 12/2012 | McSheffrey | |
| 2013/0213744 A1 | 8/2013 | Foley | |
| 2014/0021917 A1 * | 1/2014 | Paupert | B60L 11/1818 320/109 |
| 2014/0277869 A1 * | 9/2014 | King | B60H 1/00278 701/22 |
| 2014/0326542 A1 | 11/2014 | Dammeyer et al. | |
| 2014/0329113 A1 * | 11/2014 | Han | H05B 1/0236 429/7 |
| 2015/0016002 A1 | 1/2015 | He et al. | |
| 2015/0046012 A1 * | 2/2015 | Chen | B60L 1/00 701/22 |
| 2015/0132612 A1 * | 5/2015 | Bornet | H01M 10/633 429/7 |
| 2015/0210181 A1 * | 7/2015 | Niioka | H01M 10/48 701/22 |
| 2015/0360578 A1 * | 12/2015 | Duan | B60L 11/1861 340/455 |

FOREIGN PATENT DOCUMENTS

| | | |
|---|---|---|
| DE | 10260355 A1 | 7/2004 |
| DE | 102008050398 A1 | 4/2010 |
| DE | 102010003216 A1 | 9/2011 |
| DE | 102012101329 A1 | 9/2012 |
| DE | 112010003366 T5 | 10/2012 |
| DE | 102012107700 A1 | 1/2014 |
| EP | 0726632 A1 | 8/1996 |
| EP | 1026042 A2 | 8/2000 |
| EP | 1046545 A2 | 10/2000 |
| EP | 1544976 A1 | 6/2005 |
| EP | 2144346 A1 | 1/2010 |
| EP | 2648300 A1 | 10/2013 |
| EP | 2843792 A1 | 3/2015 |
| JP | 2002354883 A | 12/2002 |
| JP | 2003267697 A | 9/2003 |
| JP | 2003341995 A | 12/2003 |
| NO | 2006009672 A1 | 1/2006 |
| WO | 0178449 A1 | 10/2001 |
| WO | 2009129295 A2 | 10/2009 |
| WO | 2012077304 A2 | 6/2012 |
| WO | 2013075672 A1 | 5/2013 |

OTHER PUBLICATIONS

Information pertaining to Public Use set forth in the IDS Cover Sheet mailed together with the present Information Disclosure Statement on Apr. 13, 2016.
Athina Nickitas-Etienne; PCT International Preliminary Report on Patentability and Written Opinion; PCT/US2016/015382; dated Oct. 3, 2017; The international Bureau of WIPO; Switzerland.

* cited by examiner

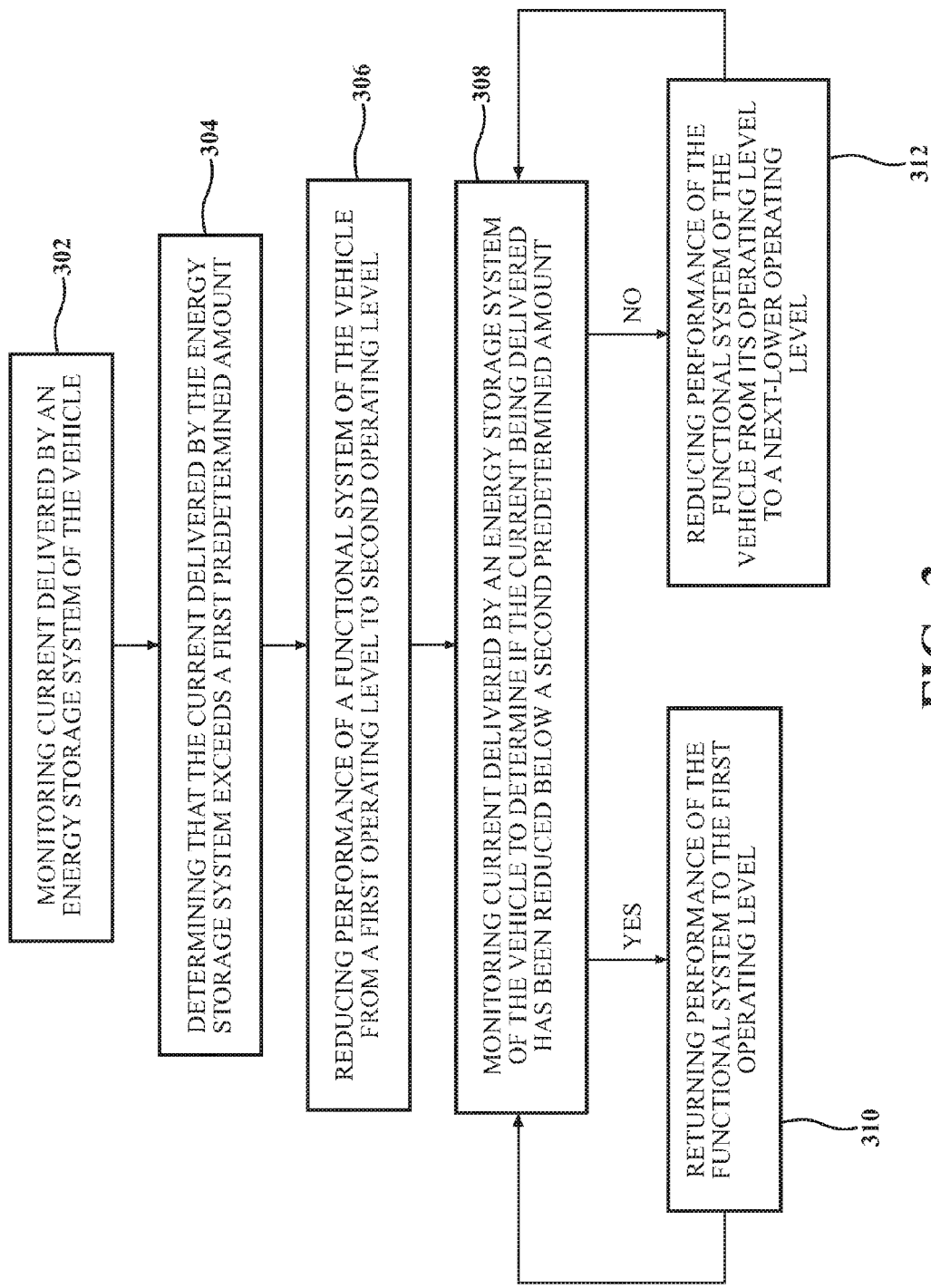

US 9,981,836 B2

METHOD FOR CONTROLLING A FUNCTIONAL SYSTEM OF A MATERIALS HANDLING VEHICLE

CROSS REFERENCE TO RELATED APPLICATION

This application claims the benefit of U.S. Provisional Patent Application Ser. Nos. 62/140,819, filed Mar. 31, 2015, and entitled "METHOD FOR CONTROLLING A FUNCTIONAL SYSTEM OF A MATERIALS HANDLING VEHICLE;" and 62/246,225, filed Oct. 26, 2015, and entitled "METHOD FOR CONTROLLING A FUNCTIONAL SYSTEM OF A MATERIALS HANDLING VEHICLE;" the entire disclosures of which are hereby incorporated by reference herein.

FIELD OF THE INVENTION

The present invention relates generally to controlling a functional system of a materials handling vehicle, and, more particularly, to reducing performance of one or more tasks of the functional system if a current delivered by an energy storage system exceeds a predetermined amount.

BACKGROUND OF THE INVENTION

Materials handling vehicles, such as counterbalance forklift trucks, reach trucks, turret trucks, etc., include an energy storage system (ESS), e.g., a battery or a fuel cell, for providing power to one or more functional systems of the vehicle. Exemplary functional systems include: a traction control system, which controls movement of the vehicle across a floor surface; a primary load handling assembly system, which is used to raise and lower a load via a moveable assembly of the vehicle; and an auxiliary load handling assembly system, which performs additional tasks such as tilt and sideshift of a load via a fork carriage assembly.

Traditionally, functional system(s) in materials handling vehicles experience lost performance as the ESS discharges its energy, due in part to a decline in ESS voltage as the ESS state-of-charge declines. In order to deliver a steady power output, which is intended to correspondingly yield generally constant functional system performance, the current drawn from the ESS is increased to accommodate the reduction in ESS voltage as the ESS state-of-charge declines. If such increased current draws are allowed to continue unlimited, some components of the ESS, such as terminals, connectors, contactors, and fuses, may become stressed, and consequently require higher levels of maintenance and/or repair.

BRIEF SUMMARY OF THE INVENTION

One aspect of the present invention relates to a device for controlling a functional system of a materials handling vehicle that includes a current sensing, or similar current estimating technology, for monitoring a current delivered by an energy storage system for powering the functional system, the energy storage system comprising at least one of a battery and a fuel cell. The device also includes a current limiter for reducing performance of the functional system from a first operating level to a second operating level for at least one task of the functional system to attempt to reduce the current delivered by the energy storage system, when the current delivered by the energy storage system exceeds a first predetermined amount.

Another aspect of the present invention relates to a method for controlling a functional system of a materials handling vehicle that includes monitoring a current delivered by an energy storage system for powering the functional system, the energy storage system comprising at least one of a battery and a fuel cell. When the current delivered by the energy storage system exceeds a first predetermined amount, performance of the functional system is reduced from a first operating level to a second operating level for at least one task of the functional system to attempt to reduce the current delivered by the energy storage system.

Yet another aspect of the present invention relates to a method of estimating a period of time that includes periodically sensing a respective temperature of each of a plurality of components of an industrial vehicle while the vehicle is powered on. From among the most recently sensed respective temperatures, the method includes storing the maximum respective temperature and storing the minimum respective temperature. When it is detected that the vehicle is powered on from a powered off condition, the method continues by sensing a new respective temperature of each of the plurality of components and, from among the new respective temperatures, determining a maximum new respective temperature. Eventually, the method continues by estimating a period of time the vehicle was in the powered off condition based on the stored maximum respective temperature and the maximum new respective temperature.

BRIEF DESCRIPTION OF THE SEVERAL VIEWS OF THE DRAWINGS

FIG. 3 is a flowchart of an example process for regulating current in accordance with the principles of the present invention.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
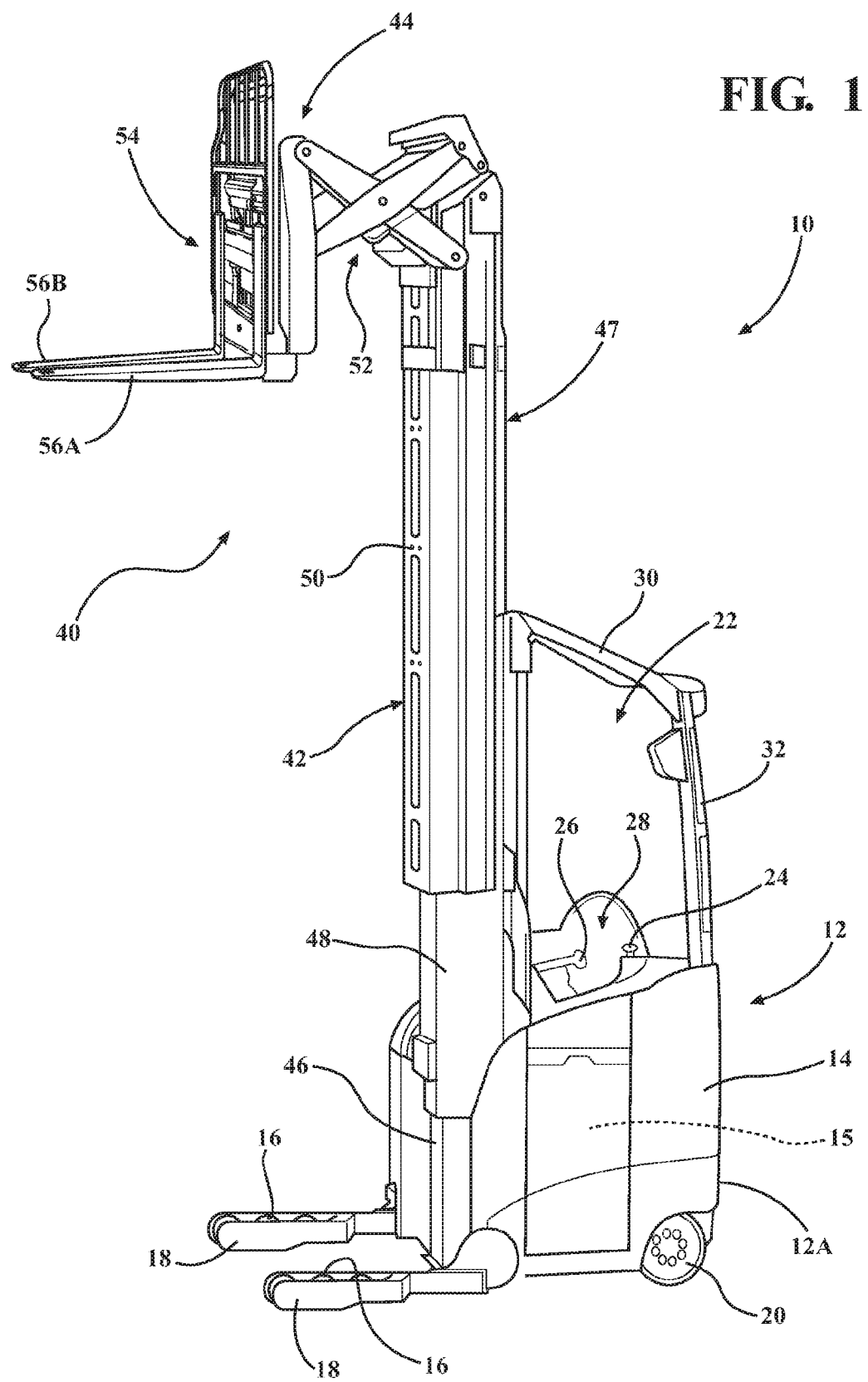
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that present invention may be used in a variety of other types of materials handling vehicles.

The vehicle 10 includes a main body or power unit 12, which includes a frame 14 defining a main structural component of the vehicle 10 and which houses an energy storage system 15, which could include a battery and/or a fuel cell. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a horizontal support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested lower and upper movable mast members 48, 50. It is noted that the mast assembly 42 may include additional or fewer movable mast members than the two shown in FIG. 1, i.e., the lower and upper movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al. and assigned to the applicant, Crown Equipment Corporation, the entire disclosure of which is hereby incorporated by reference herein.

Figure 2A:
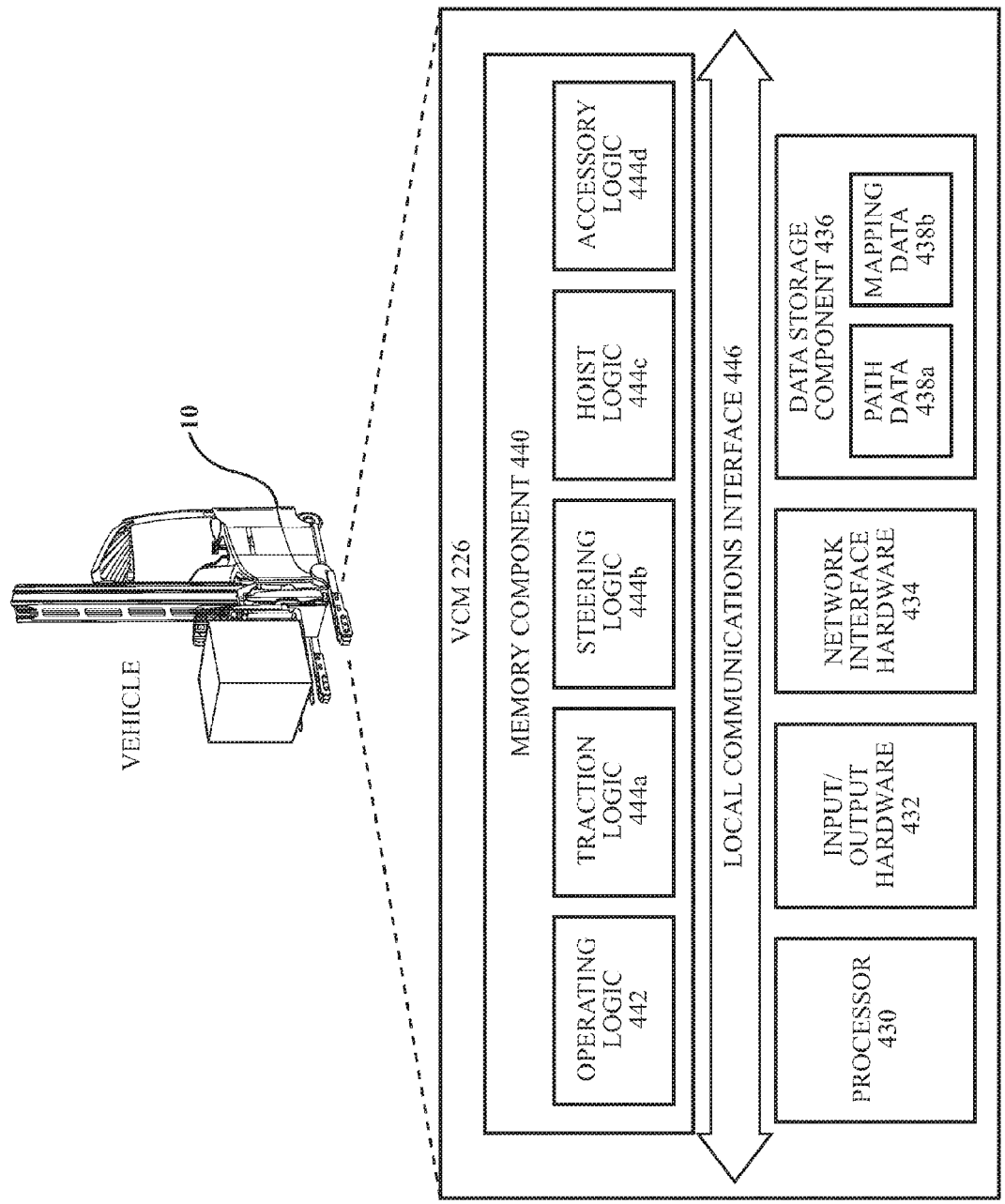
FIG. 2A depicts a computing environment for providing control logic in a vehicle control module (VCM) of the vehicle of FIG. 1.

FIG. 2A depicts a computing environment for providing control logic in a vehicle control module (VCM) 226, according to one or more embodiments shown and described herein. The vehicle control module 226 and the way it interfaces with various operator controls and other functional systems of the vehicle 10 are more fully described in U.S. Patent Publication Nos. 2010/0228428 and 2014/0188324, the disclosures of which are incorporated herein by reference in their entireties.

In the illustrated embodiment, the VCM 226 includes a processor 430, input/output hardware 432, network interface hardware 434, a data storage component 436 (which can store current values as described below, and/or other data), and a memory component 440. The data storage component 436 and the memory component 440 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shut down and restarted may beneficially be stored in non-volatile memory. Also, depending on the particular embodiment, the non-transitory computer-readable medium, mentioned above, may reside within the VCM 226 and/or external to the VCM 226.

Additionally, the memory component 440 may store operating logic 442, traction logic 444a, steering logic 444b, hoist logic 444c, and accessory logic 444d. The operating logic 442 may include an operating system and/or other software for managing components of the VCM 226. The traction logic 444a may be configured with one or more algorithms and parameters for facilitating optimal traction control for the vehicle 10. The steering logic 444b may be configured with one or more algorithms and parameters for facilitating optimal steering control of the vehicle 106. The hoist logic 444c may include one or more algorithms and parameters for facilitating optimal hoist control of the vehicle 10, which acts as the primary load handling assembly system used to raise and lower the moveable assembly 47 of the vehicle 10. Additionally, the accessory logic 444d may include one or more algorithms and parameters for providing control of accessories of the vehicle 10 such as an auxiliary load handling assembly system, which performs additional tasks such as tilt and sideshift of the carriage assembly 44. A local communication interface 446 is also included in FIG. 2A and may be implemented as a bus or other communication interface to facilitate communication among the components of the VCM 226.

The processor 430 may include any processing component operable to receive and execute instructions (such as from the data storage component 436 and/or the memory component 440). The input/output hardware 432 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 434 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 226 and other computing devices.

It should be understood that the components illustrated in FIG. 2A are merely exemplary and are not intended to limit the scope of this disclosure. While the components in FIG. 2A are illustrated as residing within the VCM 226, this is merely an example. In some embodiments, one or more of the components may reside external to the VCM 226. It should also be understood that while the VCM 226 in FIG. 2A is illustrated as a single device, this is also merely an example. In some embodiments, the traction logic 444a, the steering logic 444b, the hoist logic 444c, and/or the accessory logic 444d may reside on different devices. Additionally, while the VCM 226 is illustrated with the traction logic 444a, the steering logic 444b, the hoist logic 444c, and the accessory logic 444d as separate logical components, this is also an example. In some embodiments, a single piece of logic may cause the VCM 226 to provide the described functionality.

It also should be understood that the VCM 226 may communicate with various sensors and other control circuitry of the vehicle 10 to coordinate the various conditions of manual operation and automatic operation of the vehicle 10.

Figure 2B:
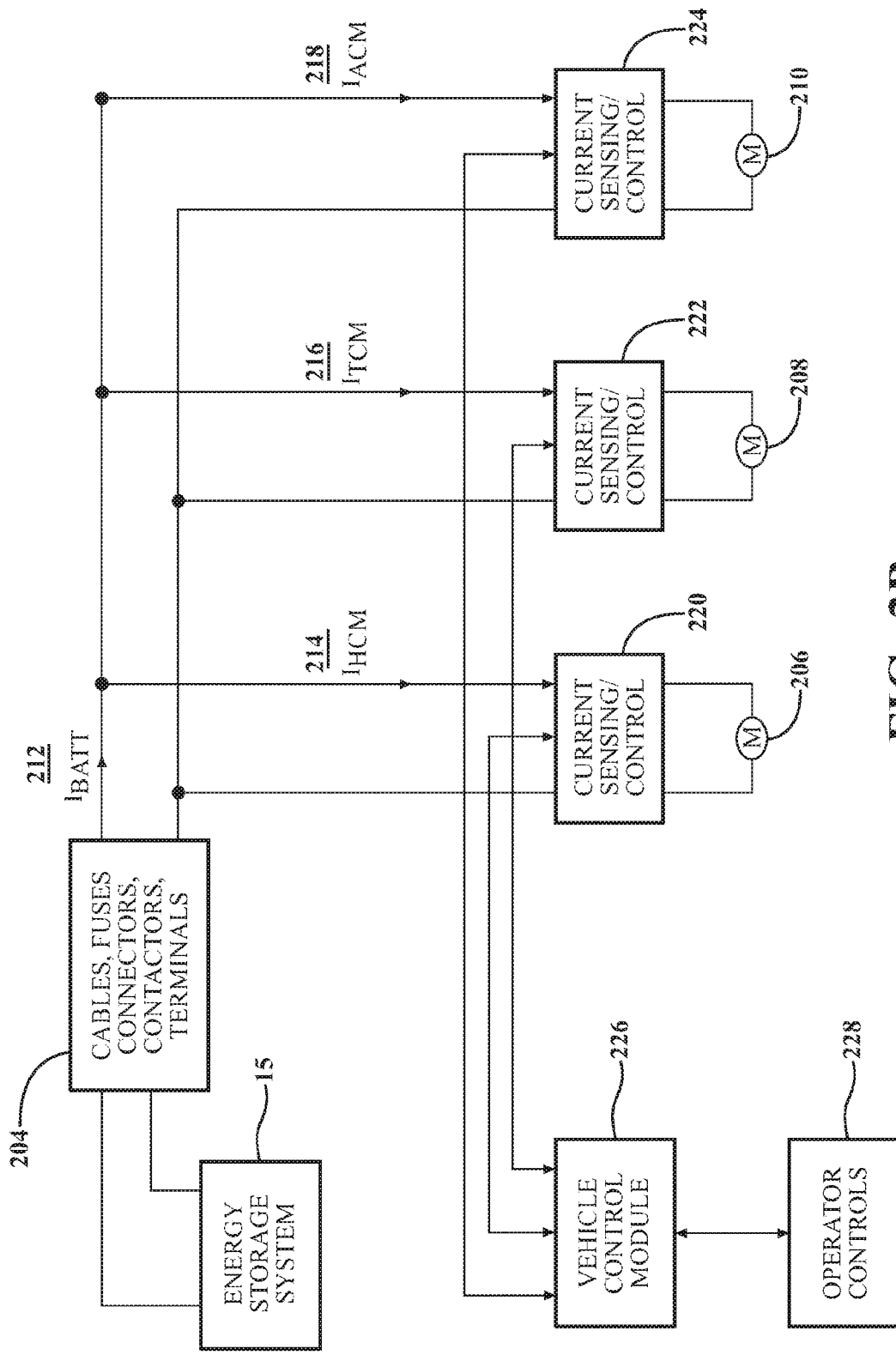
FIG. 2B illustrates schematically a number of operational features of the vehicle of FIG. 1 having a vehicle control module and operator controls in accordance with the principles of the present invention.

FIG. 2B illustrates schematically a number of operational features of the vehicle 10 having a vehicle control module 226 and operator controls 228, such as the tiller knob 24 and multi-function control handle 26 described above for FIG. 1. With reference to FIG. 2B, the energy storage system 15 (also referred to herein as an "ESS" and which could include a battery and/or a fuel cell as stated above) supplies power to a traction motor 208 connected to the driven and steered wheel 20 (See FIG. 1) and to one or more hydraulic motors 206, 210, which supply power to several different systems, such as hydraulic cylinders for effecting generally vertical movement of the movable assembly 47, i.e., generally vertical movement of the movable mast members 48, 50 or of carriage assembly 44 relative to the mast assembly 42, generally longitudinal movement of the reach assembly 52, commonly referred to as reach, and generally transverse or lateral movement of the fork carriage 54, commonly referred to as sideshifting. The traction motor 208 and the driven and steered wheel 20 define a drive mechanism for effecting movement of the vehicle 10 across the floor surface.

As noted, the energy storage system 15 provides current, $I_{BATT}$ 212, to power a variety of functional systems of the vehicle 10. The vehicle 10 includes a number of different components 204 involved with providing the current 212 to the various functional systems. These components 204 can include, for example, ESS terminals, fuses, ESS cables, other cables, connectors and couplings, as well as contactors. These components 204, as well as the energy storage system 15, are designed to provide an approximately steady output power even when the current 212 increases as the energy storage system 15 discharges and its terminal voltage declines as its state-of-charge declines.

The functional systems of the vehicle 10 can include, for example, a hydraulic control module 220 and motor 206, which collectively define a hydraulic control functional system and that operate to lower and raise the moveable assembly 47 of the vehicle 10; a traction control module 222 and motor 208, which collectively define a traction control functional system and that operate to allow the vehicle 10 to travel; and an accessory control module 224 and motor 210, which collectively define an auxiliary control functional system and that perform auxiliary load-handling functions of the vehicle 10, such as, for example, tilt and sideshifting.

The components 204 can be considered to define a power delivery network (PDN) that transfers energy from the energy storage system 15 to the functional systems. This PDN may reach operational limits during periods of continuous, high constant power operation. If the current passing through the PDN is allowed to continue unlimited, some components of the energy storage system 15 or of the PDN may become stressed and consequently result in higher levels of maintenance and/or repair. Thus, the vehicle control module 226 can sense the individual currents being provided to each of the functional systems of the vehicle 10 to determine if the energy storage system 15 and the PDN components 204 are providing an excessive amount of current 212. If so, then the vehicle control module 226 can regulate operation of one or more of the functional systems of the vehicle 10 to reduce the current 212.

In particular, the current $I_{BATT}$ 212 can include three components: a) the current $I_{HCM}$ 214 provided to the hydraulic control functional system, b) the current $I_{TCM}$ 216 provided to the traction control functional system, and c) the current $I_{ACM}$ 218 provided to the auxiliary control functional system. Each of these functional systems can perform a variety of tasks based on input received via the operator controls 228 and communicated to the vehicle control module 226. For example, a vehicle operator can provide input that controls raising or lowering of the movable assembly 47 or the carriage assembly 44. The operator could also provide input, for example, that results in a side-shift operation of the fork carriage 54, tilting of the fork carriage 54, moving the vehicle 10 forward, moving the vehicle 10 backwards, or braking the vehicle 10. Thus, each of the functional systems of the vehicle 10 depicted schematically in FIG. 2B can be related to respective tasks that can be performed.

Each of the tasks can be performed at a variety of different operating levels. In other words, the task of raising the movable assembly 47 can be performed at various speeds depending on the input received from the operator controls. For example, there may be nine different performance based limits, at which the movable assembly 47 can be raised (or lowered) when there is no load present on the forks 56A, 56B. Similarly, there can be, for example, five different performance based limits that the movable assembly 47 can be raised (or lowered) when a load (e.g., more than 300 pounds) is present on the forks 56A, 56B. The operator provides input that selects a speed, or operating level, and the VCM 226 controls the functional system so that the task is performed according to that input but in conformance with one of the performance based limits. Each of the different performance based limits for a task may limit different amounts of power utilized and, thus, draw different amounts of current to accomplish a desired task at a user-specified, or automatically programmed, operating level.

In accordance with the principles of the present invention, it is beneficial to monitor the current 212 being drawn from the energy storage system 15 to determine when an excessive amount of current is being drawn from the energy storage system 15. An amount of current that exceeds a predetermined amount such that it would be considered an "excessive amount" can depend on a number of different variables. Battery or fuel cell size as well as discharge rate can be a factor. The size of the cables and the specifications of the connectors and contactors within the PDN can also be a factor. For a particular vehicle 10 and a specific configuration of components 204, one of ordinary skill would be able to determine which component is a limiting factor that would first be affected by a high amount of current. Thus, the predetermined value for the "excessive amount" of current can be based on that limiting component.

Another factor in determining an "excessive amount" of current is based on time. For example, one amount of current draw from the energy storage system 15 may be tolerated for about one second but that same amount would not be tolerated if it lasted for one minute. Thus, there can be different "excessive amounts" of current for different periods of time. For example, providing about 350 Amps (hereinafter "A") from the energy storage system 15 may be tolerated if it lasts for about one second or less but only 250 A may be tolerated if it occurs over a period lasting one minute or more. Thus, it may be beneficial to monitor an amount of current 212 being provided by the energy storage system 15 for a plurality of distinct periods of time (e.g., one second, one minute, five minutes, and fifteen minutes). Of course, one of ordinary skill would recognize that other periods of time could be selected without departing from the scope of the present invention.

When the current 212 from the energy storage system 15 does not exceed a predetermined threshold, then the tasks of the various functional systems are performed according to the programming of the VCM 226 and the operator controls 228. If the operator controls the vehicle 10 to raise the movable assembly 47 at speed setting "4" or to drive the vehicle 10 forward at a speed of "6", then the VCM causes such operation to occur. Each task is performed at a first operating level as determined by the design and configuration of the vehicle 10. However, when the VCM 226 determines that an excessive amount of current 212 is being provided by the energy storage system 15 for one of the monitored time periods, then the VCM 226 can cause the regulation of that current in an attempt to lower the amount of current 212 being provided by the energy storage system 15. For example, if the current $I_{BATT}$ 212 exceeds a predetermined amount, then the task of raising the movable assembly 47 can be performed at 80% of the operating level it would otherwise be performed at if an excessive current 212 had not been detected.

As one particular example, the operator controls 228 may indicate that the movable assembly 47 should be raised at a speed of "5". If an excessive current 212 has been detected, then the VCM 226 can act as a "governor" and allow the movable assembly 47 to only be raised at a speed of "4". In this way, the current $I_{HCM}$ 214 being provided to the motor 206 can be limited or regulated. As another example, the sum of the currents 216, 218 can be monitored to determine if they exceed the predetermined amount and, if so, then the speed at which the movable assembly 47 can be raised or lowered can be regulated in an attempt to reduce the current 212 being supplied by the energy storage system 15. As one particular example, if the sum of the currents 216, 218 exceeds a predetermined amount for a most recent one-second period, then the speed at which the movable assembly 47 can be raised (or lowered) can be limited. More specifically, if the sum of the currents 216, 218 exceeds 100 A, and the operator input indicates that the raising speed of the movable assembly 47 should be at a speed "X", then the VCM 226 can control that functional system so that the movable assembly 47 is only raised at a speed of "0.88*X". If the sum of the currents 216, 218 exceeds 200 A, then the movable assembly 47 can be controlled so that it is raised at a speed of "0.75*X"; and if the sum of the currents 216, 218 exceeds 300 A, then the movable assembly 47 can be controlled so that it is raised at a speed of "0.60*X".

Accordingly, rather that shutting down the vehicle 10, or a functional system of the vehicle 10 when an excessive current is detected, all tasks of the functional systems continue to be performed. However, rather than a task being performed at a first operating level, it is performed at a reduced second operating level in an attempt to reduce the current 212 being provided by the energy storage system 15. One of ordinary skill will recognize that the above examples may be modified such that different reductions of current can occur and that different tasks of different functional systems may be regulated, or governed, in an attempt to reduce the current 212 being provided by the energy storage system 15. Thus, the VCM 226 is operating as a current limiter by reducing the operating level of one or more functional systems of the vehicle 10.

FIG. 3 is a flowchart of an example process for regulating current in accordance with the principles of the present invention. In step 302, the amount of current being delivered by an energy storage system of a vehicle is monitored so that it can be determined, in step 304, when that current exceeds a predetermined amount. Once it is determined that the current exceeds a predetermined amount, then the performance of one of the functional systems of the vehicle can be reduced from a first operating level to a second operating level, in step 306. In step 308, the current being provided by the energy storage system is continued to be monitored. If the amount of current being provided has been successfully reduced so that it is now lower than a second predetermined amount, then the operating level of the functional system that had been reduced can now be restored to its initial operating level (see step 310). If the current being provided by the energy storage system has not been successfully reduced, then the reduced operating level of the functional system can be maintained or the operating level can be further reduced to a lower operating level (see step 312).

In the above examples, the current 212 being drawn from the energy storage system 15 could include historical information that related to the last one second, the last one minute, the last five minutes or even the last fifteen minutes. Also, the current 212 could be a sum of a plurality of different currents such as currents 214, 216, 218. Depending on the sampling rate and the number of individual currents being sampled, the number of sampled current values that would need to be stored to provide such historical information may introduce a computational and storage burden that has a number of drawbacks. Thus, in accordance with the principles of the present invention, the historical current values and information can be economically and easily stored as described below.

Figure 4:
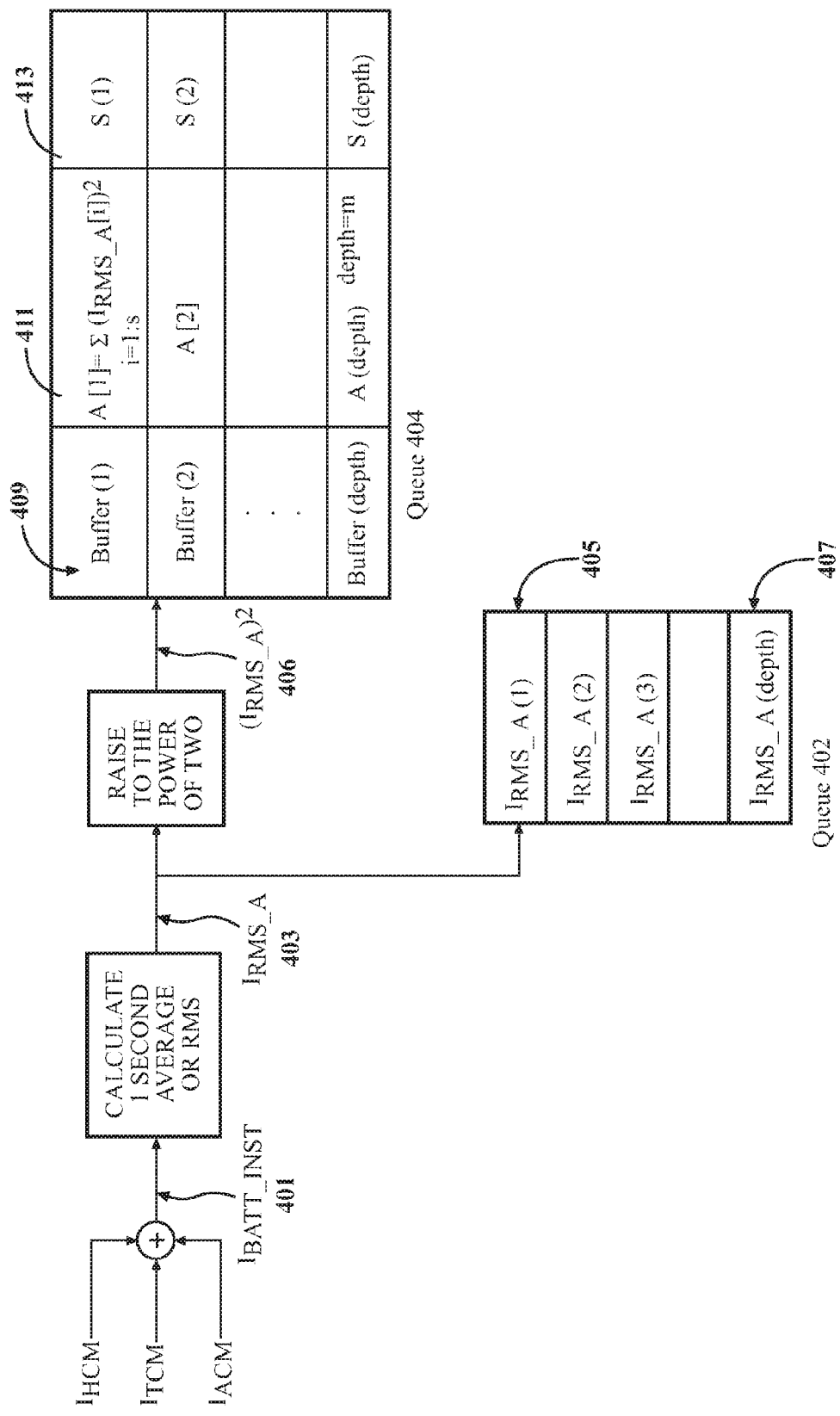
FIG. 4 illustrates a high-level view of how memory circuitry can be arranged that can store various amounts of historical information about current drawn from an energy storage system of the vehicle of FIG. 1.

FIG. 4 illustrates a high-level view of how memory circuitry can be arranged that can store various amounts of historical information about current drawn from an energy storage system 15 of the vehicle 10. In particular, the circuitry of FIG. 4 can store historical current-related information in an efficient and compact manner, as described more fully below. As mentioned above, the VCM 226 can include non-volatile memory as part of the data storage component 436. The example memory circuitry described below can be implemented within such non-volatile memory so that the data stored within the memory circuitry is available after the vehicle 10 is shut off and then powered back on, to effectively avoid an operator bypassing a reduction of performance by shutting the vehicle 10 down.

The current $I_{BATT}$ 212 being provided by, or drawn from, the energy storage system 15 can be sampled at 10's or even 100's of samples per second to provide a plurality of instantaneous current readings $I_{BATT\_INST}$ 401. Because the current 212 from the energy storage system 15 may fluctuate over various time periods, it may be beneficial to calculate a root mean square (RMS) value for current, as this would correspond to a direct current (DC) that would effectively deliver the same average electrical power as the fluctuating current.

If the current $I_{BATT}$ 212 is sampled at 60 Hertz (hereinafter "Hz"), then 60 samples could be used to calculate $I_{RMS-A}$ 403 over a one-second time period according to:

$$I_{RMS-A} = \sqrt{\frac{1}{60} * (x_1^2 + x_2^2 \ldots + x_{60}^2)}$$

where $x_i$ are the 60 instantaneous samples $I_{BATT\_INST}$ 401 of the current $I_{BATT}$ 212. For example, the current $I_{BATT}$ 212 can be a sum of the three currents being provided to the three example functional systems of the vehicle 10 depicted in FIG. 2B. Thus, instantaneous values of the three individual currents $I_{HCM}$, $I_{TCM}$ and $I_{ACM}$ can each be measured and added together to calculate each of the 60 instantaneous values $I_{BATT\_INST}$ 401 for $I_{BATT}$ 212. These 60 instantaneous values for $I_{BATT}$ 212 can then be discarded. The next 60 instantaneous current samples can be captured and used to calculate a new $I_{RMS-A}$ 403 value for the next second. As each of the one-second values $I_{RMS-A}$ 403 are calculated, they can be stored in a queue 402, and accumulated into a second queue 404. The queue 402 can be implemented as a FIFO buffer, or circular queue, such that a most-recently calculated value 405 is pushed onto the queue 402 in position "#1" about every second so that all the values in the queue 402 move down a position and the value 407 at position "#n" exits out of the queue 402 (after about one minute if the depth of the queue 402 is "60"). Thus, the queue 402 provides (in position "#1") a one second $I_{RMS-A}$ value 405 for the most recent sampling of instantaneous readings of current $I_{BATT}$ 212 and a history of the $I_{RMS-A}$ values for $I_{BATT}$ 212 calculated for each of the last n seconds. An accurate one minute RMS calculation can be generated from the collection of 60 one second $I_{RMS-A}$ values found in queue 402.

The second queue 404 can be configured such that its entries are calculated based on a plurality of s $I_{RMS-A}$ values, accumulated at some predefined level that balances system memory and resolution of the memory history calculation. For example, an accumulator 411 may store an accumulated value involving up to 60 one second $I_{RMS-A}$ values. A number of accumulators shown as "A[1]" through "A[m]" in FIG. 4 includes one accumulator "A[1]" that maintains a summation involving the last s $I_{RMS-A}$ calculated values. In particular, each $I_{RMS-A}$ 403 that is calculated is then squared to calculate a value 406 that is equal to $(I_{RMS-A})^2$. Thus, the accumulator "A[1]" 411 maintains a summation of the last s calculated values 406. Also, for example, the queue 404 may have m (e.g., 15) buffers 409 that each contains one of these accumulators along with the number samples (shown in column 413), or values, that were involved with the accumulated value for that accumulator of that buffer.

If every time s=60, the entries in "Buffer[q]" is shifted to "Buffer[q+1]" (where q varies from 1 to m−1), then the accumulator value of "A[q]" involves data related to the previous $q^{th}$ minute. Also, unless an error or other anomaly occurred while collecting the values for an accumulator, the values for "s[2]" through "s[m]" should all equal "60".

To calculate an RMS current over some predetermined timeframe such as, for example, five minutes, the values corresponding to the most recent five accumulators would be used (e.g., from FIG. 4 it would be buffers "Buffer [1]" through "Buffer [5]-. The resolution of this calculation may have a slightly varying number of samples as the buffer (e.g., "Buffer [1]") corresponding to the most recent accumulator (e.g., "A[1]") may have anywhere between 1 and 60 accumulated values. To further illustrate this example, if the accumulator "A[1]" of the actively accumulating buffer (e.g., "Buffer[1]") has 30 samples in it, then the five minute calculation, $I_{RMS-5M}$, could be calculated according to:

$$I_{RMS-5M} = \sqrt{\frac{1}{(30+4*60)} * (A[1] + A[2] + \ldots + A[5])}$$

Where each "A[i]" for i=2 to 5, contain 60 accumulated samples of the squared one second RMS current values 406, and i=1 contains the sum of the accumulated squared samples 406 since the last time the accumulator "A[1]" was pushed down the queue 404. There may be computational improvements by storing the current squared value 406, which would reduce the number of squaring computations, and associated processing. In this example, the five minute RMS calculation $I_{RMS-5M}$ would be for the last 4½ minutes. The resolution of the time period can be improved by having the queue 404 include more, shorter accumulating buffers (for example, 15 or 30 seconds deep). If the queue 404 includes m entries, then the queue 404 includes a history related to the $I_{RMS-A}$ values calculated for each of the last m/(accumulator time in minutes) minutes.

This type of queue structure and calculation technique can be used to calculate RMS currents for various time periods. For example, if the queue 404 is 30 deep, and each accumulating buffer has one minute of data, then RMS values can be calculated for five minutes, ten minutes, 15 minutes, and 30 minutes all using the same current history queue 404.

The above techniques could be used for storing historical current-related information for $I_{BATT}$ 212 but also for each of the three separate current 214, 216, 218 for each respective functional system of FIG. 2B.

Figure 5:
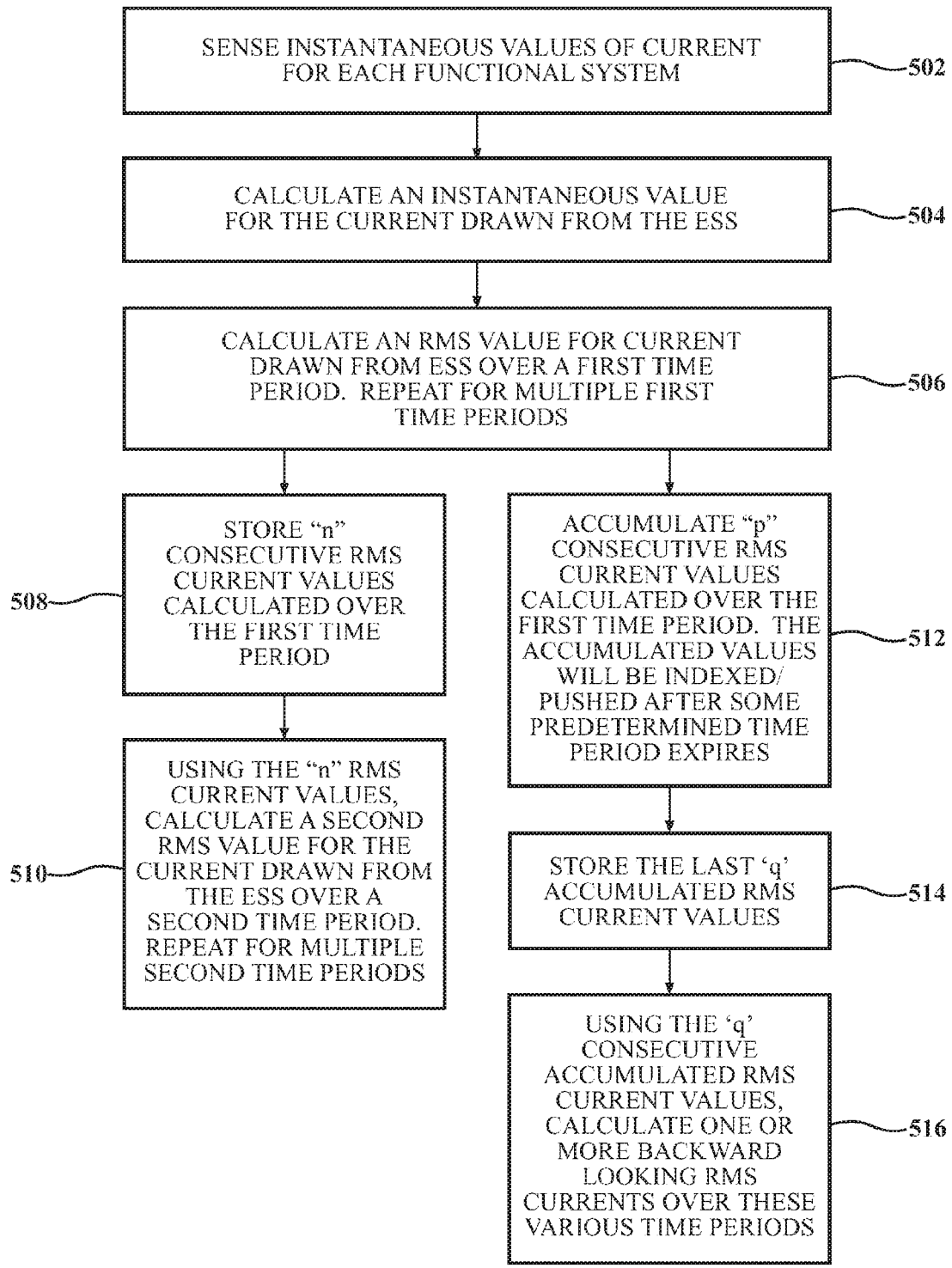
FIG. 5 illustrates a flowchart of a process for storing current-related values in the example memory structure of FIG. 4.

FIG. 5 illustrates a flowchart of a process for storing current-related values in the example memory structure of FIG. 4. In step 502, the instantaneous current values for one or more of the functional systems of the vehicle are sensed and are used, in step 504, to calculate an instantaneous value of the current 212 being provided by the energy storage system 15 of the vehicle 10. One of ordinary skill can recognize that an instantaneous value of the current 212 from the energy storage system 15 can be directly sensed as well. In step 506, these instantaneous sample values are collected over a first time period (e.g., one second) and used to calculate an RMS current value for that time period. This calculation of the RMS current value for the first time period is performed repeatedly for n first time periods so that n different RMS current values can be stored in step 508. If the first time period is, for example, one second and n=60, then the n RMS current values can be used to calculate a second RMS value for current drawn from the ESS over a second time period, in step 510. In particular, the second time period, in this example, would be equal to one minute. This calculation from step 506 may also be accumulated into larger accumulating memory in step 512, and stored, in step 514, as a collection of these larger time frame data to be used in calculating minutes of RMS current flow. In particular, one or more backward-looking RMS current values for various time periods can be calculated in step 516 using the stored accumulated values. As mentioned above, additional levels of calculating RMS current values for more time periods can be performed without departing from the scope of the present invention.

As mentioned above, one or more of the queues 402, 404, or portions thereof, can be stored in non-volatile memory such that the values stored there remain in the queue even if the vehicle is powered off and then powered back on. However, if the vehicle has been turned off for 10 minutes and then turned back on, the values in the queues 402, 404 do not accurately reflect the current provided by the ESS (i.e., none or very minimal) over that 10 minute period. Accordingly, any values calculated (e.g., 5-minute, 15-minute, or 30-minute RMS values) based on the accumulators in queue 404 would be inaccurate as well.

If a clock, or similar timing circuitry, on the vehicle remains active even when the vehicle is powered off, then it can measure how long of a period of time the vehicle was powered off. When the vehicle is powered back on, then this period of time can be used by the VCM 226 to put values into the accumulators A[j] of queue 404 that more accurately reflect the current provided by the energy storage system during the last m minutes (in the example embodiment of FIG. 4) which can include a period of time that the vehicle was powered off. For example, if the vehicle was turned off for three minutes, then a "0" could be pushed into accumulator A[1] three times when the vehicle is powered back on. The result would be that the values in accumulators A[1]-A[m−3] would each be pushed down the queue 404 three places, accumulators A[1], A[2], and A[3] would all be set to "0", and the three oldest accumulator values would be pushed out of the queue 404.

Figure 6:
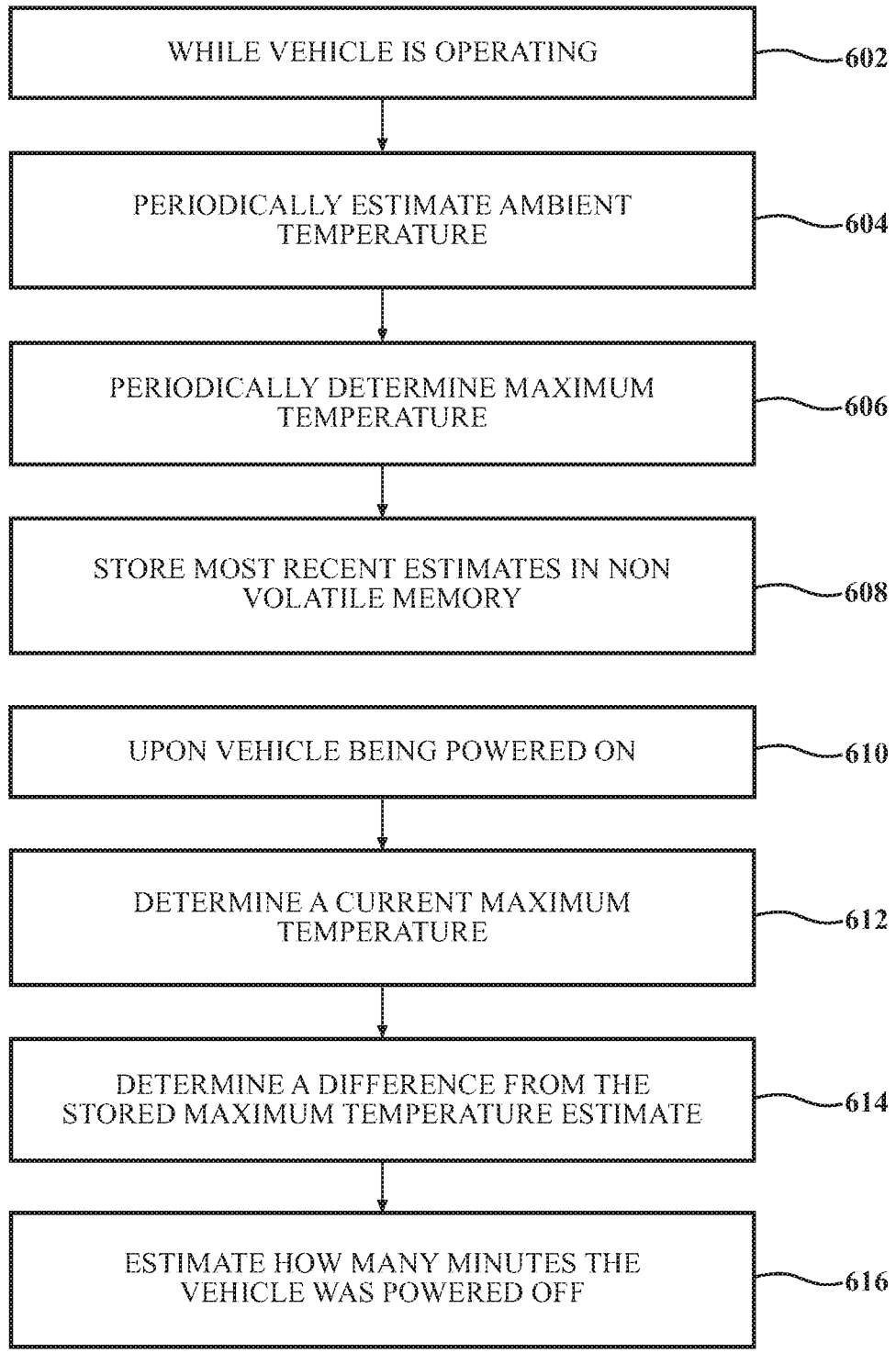
FIG. 6 illustrates a flowchart of a process for estimating a time period that a vehicle was powered off in accordance with the principles of the present invention.

When a clock is not available to provide the time information, then the time between when the vehicle was powered off and then powered back on may be estimated using physical characteristics of the vehicle. For example, the temperature of various components of the vehicle may be used to estimate how long the vehicle has been powered off. FIG. 6 illustrates a flowchart of a process for estimating a time period that a vehicle was powered off in accordance with the principles of the present invention.

While the vehicle is operating, in step 602, an ambient temperature is periodically estimated, in step 604, and a maximum temperature of a vehicle component is periodically calculated in step 606. The traction control functional system, for example, can include one or more motors, power-control circuitry, and other sensors that each may heat-up during operation of the vehicle. The hydraulic control functional system also can include one or more motors that, depending on the operator input, may rise in temperature as well during vehicle operation. The respective temperatures of these various components of the vehicle can be monitored and used in steps 604 and 606.

For example, of all the different temperatures that are sensed, the lowest temperature value can be used as an estimate for the ambient temperature of the environment in which the vehicle is presently operating. Of all the different temperatures that are sensed, the highest temperature value can be determined and considered a "maximum temperature". The ambient temperature and the maximum temperature can be determined periodically such as, for example, once every minute or once every 10 seconds.

In step 608, a most recently estimated ambient temperature and a most recently determined maximum temperature can be stored in a region of non-volatile memory accessible by the VCM 226. Thus, if the vehicle is powered off, this memory will include temperature values that correspond to about the time the vehicle was powered off.

In step 610, the vehicle is powered back on and a current maximum temperature is calculated in step 612. Similar to how the maximum temperature was calculated in step 606, the respective temperature of various components of different functional systems of the vehicle are sensed in order to determine a new maximum temperature. Because the vehicle has been powered off, the new maximum temperature calculated in step 612 is most likely less than the old maximum temperature stored in memory in step 608. In particular, the difference between the new maximum temperature and the old, stored maximum temperature correlates to how long the vehicle has been powered off. The longer the vehicle has not been operating, the greater the difference will be between these two temperatures. Thus, in step 614, this difference is calculated and used, in step 616, to estimate how many minutes the vehicle was powered off before being powered back on.

While there are many possible ways to estimate a time period based on the difference in temperature between the two maximum temperatures, one example technique is described below in detail. Other functionally equivalent techniques may also be used without departing from the scope of the present invention. In general, a time estimate (in minutes, for example) can be calculated by scaling the difference between the two maximum temperatures by a temperature decay rate. This temperature decay rate can depend on the ambient temperature, for example, and is indicative of a correlation between an amount of time and a drop in temperature. Because the various components of the vehicle for which the temperatures are being sensed have different physical shapes and are constructed from different materials, their respective temperature decay rate values may vary as well. For example, components with a large thermal mass may drop in temperature at a slower rate; or components with thermally conductive outer surfaces may drop in temperature at a faster rate. One approach, for example a conservative approach, would be to assume the temperature decay rate value to use in the calculation of step 616 relies on the slowest possible temperature decay rate of all the components. Thus, the time estimate calculation in step 616 could be performed according to:

$$\text{Time} = \frac{T_{MAX_{OLD}} - T_{MAX_{NEW}}}{\text{Decay Rate}}$$

where $$\text{Decay Rate} = \frac{T_{MAX_{OLD}} - T_{AMB_{OLD}}}{\text{Slowest Thermal Time Constant}}$$

In the above equations, the stored maximum temperature is $T_{MAX_{OLD}}$, the stored ambient temperature estimate is $T_{AMB_{OLD}}$, the newly calculated maximum temperature now that the vehicle has been powered back on is $T_{MAX_{NEW}}$, and a thermal constant is selected in order to provide a beneficial decay rate value. As one example, a typical traction control motor may have a thermal time constant value useful in the above equations equal to "15 minutes". This time estimate can then be used as described above to push a number of "0" values onto the accumulators of the queue 404 equal to the number of minutes the vehicle was estimated to be powered down.

In accordance with another aspect of the present invention, the VCM 226 can implement a control algorithm that, for example, considers a number of factors to determine a) when to reduce the performance or operating level of a functional system of the vehicle and b) by how much to reduce that performance. As mentioned above, the speed with which the movable assembly 47 can be raised or lowered can be governed when the current 212 drawn from the energy storage system 15 exceeds one or more thresholds. The governing of this speed can, for example, be dependent not only on one or more of the calculated RMS values of the current 212 but can also depend on a load being raised or lowered by the movable assembly 47. In the table below, the leftmost column shows, by way of example, five different levels of weight that may be supported by the movable assembly 47 in accordance with this embodiment of the invention. The second column shows a corresponding maximum allowable speed that the movable assembly 47 may be raised or lowered. If no current thresholds (e.g., 1 minute, 5 minute, etc.) are being exceeded, then this second column indicates a maximum speed that the movable assembly will raise or lower regardless of the input received from the operator controls 228. Each of the next three columns corresponds to a respective one of three different current thresholds. For example, the third column can correspond to when the calculated 1 minute RMS value exceeds a predetermined threshold value, the fourth column can correspond to when the calculated 5 minute RMS current exceeds its predetermined threshold value, and the last column can correspond to when the calculated 15 minute RMS value exceeds its predetermined threshold value.

| Load Amount (pounds) | Maximum Allowable Raise Speed | Maximum Allowable Raise Speed if Above 1 Minute Threshold | Maximum Allowable Raise Speed if Above 5 Minute Threshold | Maximum Allowable Raise Speed if Above 15 Minute Threshold |
|---|---|---|---|---|
| 0-1000 | 9 | 8 | 7 | 6 |
| 1001-2000 | 7 | 5 | 5 | 3 |
| 2001-3000 | 6 | 5 | 5 | 3 |
| 3001-4000 | 5 | 5 | 5 | 3 |
| 4001+ | 4 | 4 | 4 | 3 |

One of ordinary skill will recognize that the loads, the particular thresholds selected for the columns, and the maximum speeds for the movable assembly 47 in the above table are provided merely by way of example and are intended to convey conceptually how the VCM 226 can govern the speed of the movable assembly 47 as a way to reduce an amount of current 212 drawn from the energy storage system 15 of the vehicle 10. Also, the energy storage system 15 may include different capacity batteries or fuel cells and different tables could be constructed for these different capacity devices.

If for example, there was a load of 2500 pounds on the movable assembly 47, then the center row of the above table would be applicable. The VCM 226 would determine if any of the calculated RMS averages exceed their respective threshold. If for example, all three thresholds are being exceeded at the present time, then the VCM 226 selects the minimum value in the center row, which is "3" in the above exemplary table. The VCM 226 uses the value "3" as a limit for the maximum speed that the movable assembly 47 can be raised or lowered. Alternatively, if only the calculated 1-minute RMS average exceeds its respective threshold, then the second and third columns of the center row are utilized to determine that the minimum value is "5" from the above exemplary table. In this alternative example, the VCM 226 uses the value "5" as a limit for the maximum speed that the movable assembly 47 can be raised or lowered.

In addition to reducing the performance of a functional system of a vehicle as described above, adjustments to other operating parameters of various vehicle subsystems can be implemented as well. For example, a fan can be located near some components of the vehicle, such as a traction motor, in order to help cool that component. The RMS current values described above can, for example, be used to control operating parameters of that fan such as whether or not the fan is turned on and the speed at which the fan is rotating. As one example, if a most recent one-minute RMS value (i.e., calculated from Buffer[1] of FIG. 4) is more than 50 amps, then a fan near the traction motor can be turned on and maintained in that condition for 20 minutes.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of estimating a period of time comprising:
periodically sensing a respective temperature of each of a plurality of components of an industrial vehicle while the vehicle is powered on;
from among the most recently sensed respective temperatures, storing the maximum respective temperature;
from among the most recently sensed respective temperatures, storing the minimum respective temperature;
detecting that the industrial vehicle is powered on from a powered off condition;
sensing a new respective temperature of each of the plurality of components;
from among the new respective temperatures, determining a maximum new respective temperature;
estimating, by a computer of the industrial vehicle, a period of time the industrial vehicle was in the powered off condition based on the stored maximum respective temperature and the maximum new respective temperature;
storing, by the computer of the industrial vehicle, an array of stored current values for a functional system of the industrial vehicle;
adjusting, by the computer of the industrial vehicle, respective current values based on the estimated period of time; and
calculating, by the computer of the industrial vehicle, a monitored current value for the functional system of the industrial vehicle based on the adjusted current values.

2. The method of claim 1, wherein estimating the period of time is based on a difference between the stored maximum respective temperature and the maximum new respective temperature.

3. The method of claim 2, wherein estimating the period of time is based on the stored minimum respective temperature.

4. The method of claim 2, wherein estimating the period of time is based on scaling the difference by a temperature decay rate.

5. The method of claim 4, wherein the temperature decay rate is selected from among a respective, corresponding temperature decay rate for each of the plurality of components.

6. The method of claim 5, wherein the selected temperature decay rate is the slowest of the respective corresponding temperature decay rates.

7. The method of claim 1, wherein the period of time is estimated according to:

$$\text{Time} = \frac{T_{MAX_{OLD}} - T_{MAX_{NEW}}}{\text{Decay}}$$

wherein
> the stored maximum respective temperature is $T_{MAX_{OLD}}$,
> the maximum new respective temperature is $T_{MAX_{NEW}}$, and
> a temperature decay rate is Decay.

8. The method of claim 7, wherein the estimated period of time is at least partly based on a stored ambient temperature value.

9. The method of claim 8, wherein the temperature decay rate is calculated according to:

$$\text{Decay} = \frac{T_{MAX_{OLD}} T_{AMB_{OLD}}}{\text{Thermal Time Constant}}$$

wherein
> an ambient temperature estimate is $T_{AMB_{OLD}}$, and
> a thermal time constant value is Thermal Time Constant.

10. The method of claim 9, wherein the thermal time constant value is selected from among a respective, corresponding thermal time constant value for each of the plurality of components.

11. The method of claim 5, wherein the selected thermal time constant value is the slowest of the respective corresponding thermal time constant values.

12. A method of estimating a period of time comprising:
> periodically sensing a temperature of at least one component of an industrial vehicle while the industrial vehicle is powered on;
> storing the most recently sensed temperature;
> detecting that the industrial vehicle is powered on from a powered off condition;
> sensing a new temperature of the at least one component;
> estimating, by a computer of the industrial vehicle, a period of time the industrial vehicle was in the powered off condition based on the stored temperature and the new temperature;
> storing, by the computer of the industrial vehicle, an array of stored current values for a functional system of the industrial vehicle;
> adjusting, by the computer of the industrial vehicle, respective current values based on the estimated period of time; and
> calculating, by the computer of the industrial vehicle, a monitored current value for the functional system of the industrial vehicle based on the adjusted current values.

13. The method of claim 12, wherein estimating the period of time is based on a difference between the stored temperature and the new temperature.

14. The method of claim 13, wherein estimating the period of time is based on scaling the difference by a temperature decay rate.

15. The method of claim 14, wherein the temperature decay rate is based on the at least one component.

16. The method of claim 12, wherein the period of time is estimated according to:

$$\text{Time} = \frac{T_{OLD} - T_{NEW}}{\text{Decay}}$$

wherein
> the stored temperature is $T_{OLD}$,
> the new temperature is $T_{NEW}$, and
> a temperature decay rate is Decay.

17. The method of claim 16, wherein the estimated period of time is at least partly based on a stored ambient temperature value.

18. The method of claim 17, wherein the temperature decay rate is calculated according to:

$$\text{Decay} = \frac{T_{MAX} - T_{AMB}}{\text{Thermal Time Constant}}$$

wherein
> an ambient temperature estimate is $T_{AMB}$, and
> a thermal time constant value is Thermal Time Constant.

19. The method of claim 18, wherein the thermal time constant value is based on the at least one component.

\* \* \* \* \*